United States Patent
Blin et al.

(10) Patent No.: US 7,484,355 B2
(45) Date of Patent: Feb. 3, 2009

(54) THRUST REVERSER COMPRISING OPTIMIZED DEFLECTOR GRATINGS

(75) Inventors: Laurent Albert Blin, Sainte Adresse (FR); Xavier Cazuc, Le Havre Rouelles (FR); Guy Bernard Vauchel, Le Havre (FR)

(73) Assignee: Aircelle, Gonfreville-l'Orcher (FR)

( * ) Notice: Subject to any disclaimer, the term of this patent is extended or adjusted under 35 U.S.C. 154(b) by 646 days.

(21) Appl. No.: 10/536,308

(22) PCT Filed: Dec. 22, 2003

(86) PCT No.: PCT/FR03/03868

§ 371 (c)(1),
(2), (4) Date: Jun. 22, 2005

(87) PCT Pub. No.: WO2004/059157

PCT Pub. Date: Jul. 15, 2004

(65) Prior Publication Data

US 2006/0005530 A1     Jan. 12, 2006

(30) Foreign Application Priority Data

Dec. 24, 2002   (FR)   ................... 02 16634

(51) Int. Cl.
*F02K 3/02*    (2006.01)
(52) U.S. Cl. ........................ 60/226.2; 60/230
(58) Field of Classification Search ................ 60/226.2, 60/230, 228
See application file for complete search history.

(56) References Cited

U.S. PATENT DOCUMENTS

| | | | |
|---|---|---|---|
| 3,076,309 A * | 2/1963 | Rowan et al. | 239/265.29 |
| 3,601,992 A * | 8/1971 | Maison | 60/226.2 |
| 3,941,313 A * | 3/1976 | Jumelle | 239/265.29 |
| 3,981,451 A * | 9/1976 | Prior et al. | 239/265.31 |
| 4,026,105 A | 5/1977 | James | |
| 4,067,094 A * | 1/1978 | Ittner | 29/889.22 |
| 4,145,877 A * | 3/1979 | Montgomery | 60/226.2 |
| 4,278,220 A * | 7/1981 | Johnston et al. | 244/110 B |
| 4,373,328 A * | 2/1983 | Jones | 60/226.2 |
| 4,731,991 A * | 3/1988 | Newton | 60/226.2 |
| 4,778,110 A | 10/1988 | Sankey et al. | |
| 5,090,197 A * | 2/1992 | Dubois | 60/226.2 |
| 5,507,143 A * | 4/1996 | Luttgeharm et al. | 60/226.2 |

(Continued)

FOREIGN PATENT DOCUMENTS

FR          2 096 650        2/1972

(Continued)

*Primary Examiner*—William H Rodriguez
(74) *Attorney, Agent, or Firm*—Oliff & Berridge, PLC

(57) ABSTRACT

The invention relates to a device comprising gratings, which are used to form a reverse flow from a jet engine thrust flow. The inventive device comprises a plurality of flow diverter gratings which are disposed side-by-side at the outer edge of an annular thrust flow circulation channel. Each of the gratings comprises a plurality of intersecting inner transverse blades and inner longitudinal blades, two adjacent gratings being separated by a side clearance which generates a leakage flow. The device also comprises means of re-directing the aforementioned leakage flow in a direction such as to increase the effectiveness of the reverse flow, said re-direction means comprising aerodynamic appendages which are mounted to at least one outer longitudinal edge of each grating.

11 Claims, 5 Drawing Sheets

U.S. PATENT DOCUMENTS

| | | | |
|---|---|---|---|
| 6,170,253 B1 * | 1/2001 | Newton | 60/226.2 |
| 6,434,927 B1 * | 8/2002 | Stretton | 60/226.2 |
| 6,557,338 B2 * | 5/2003 | Holme et al. | 60/226.2 |
| 6,584,763 B2 * | 7/2003 | Lymons et al. | 60/226.2 |
| 2003/0024236 A1 * | 2/2003 | Lymons et al. | 60/226.2 |
| 2003/0066284 A1 * | 4/2003 | Chakkera et al. | 60/226.2 |
| 2004/0231317 A1 * | 11/2004 | Dehu et al. | 60/223 |
| 2007/0283679 A1 * | 12/2007 | Pesyna et al. | 60/204 |
| 2008/0072571 A1 * | 3/2008 | Beardsley et al. | 60/226.2 |

FOREIGN PATENT DOCUMENTS

| | | |
|---|---|---|
| WO | WO 94/24430 | 10/1994 |

* cited by examiner

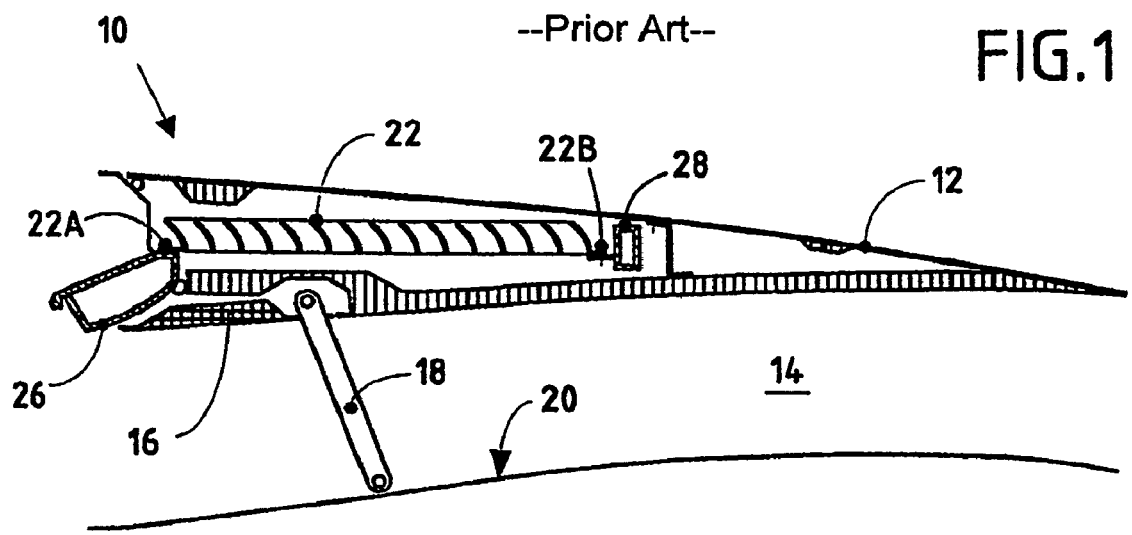
FIG. 1 --Prior Art--
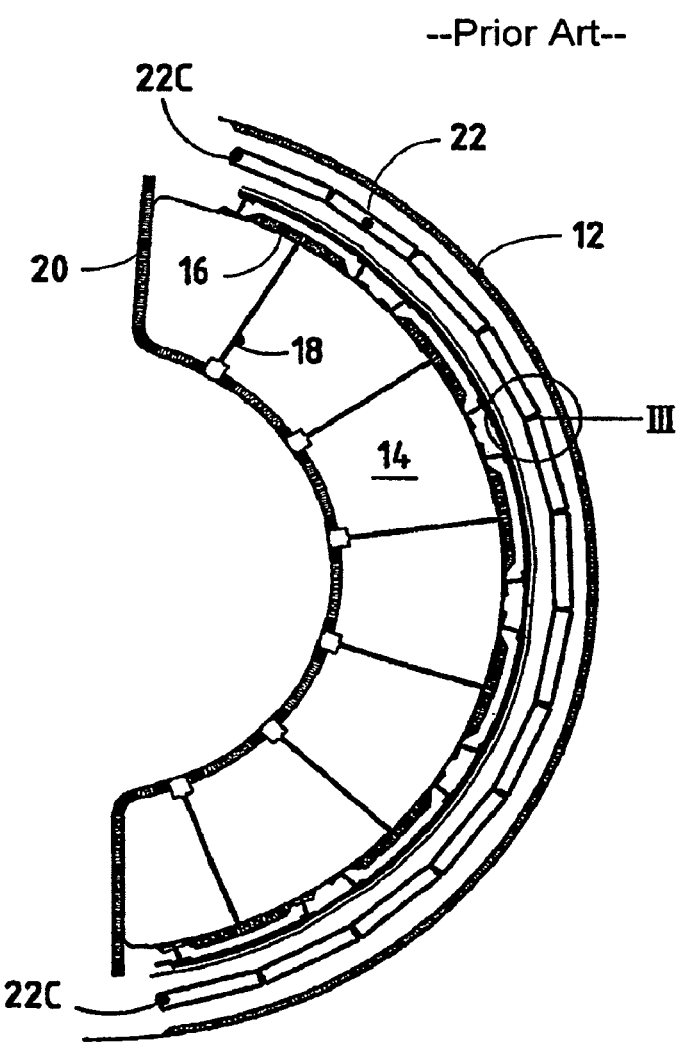
FIG. 2 --Prior Art--

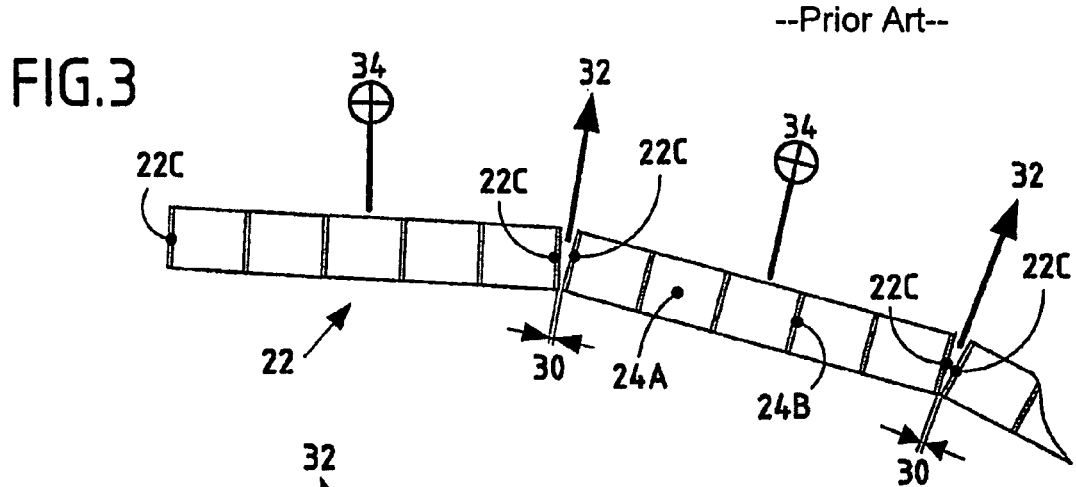
FIG.3 --Prior Art--
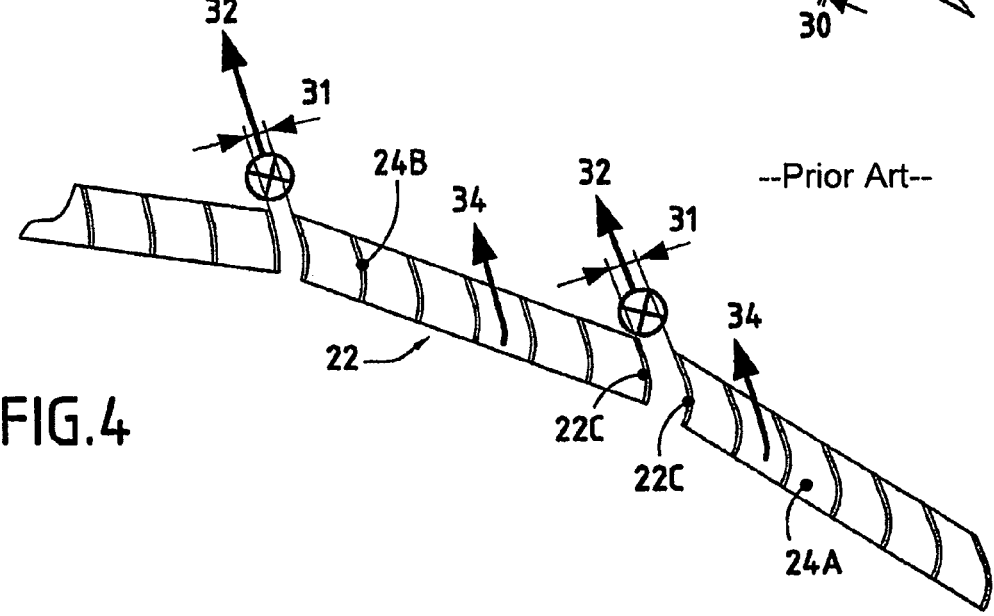
FIG.4 --Prior Art--
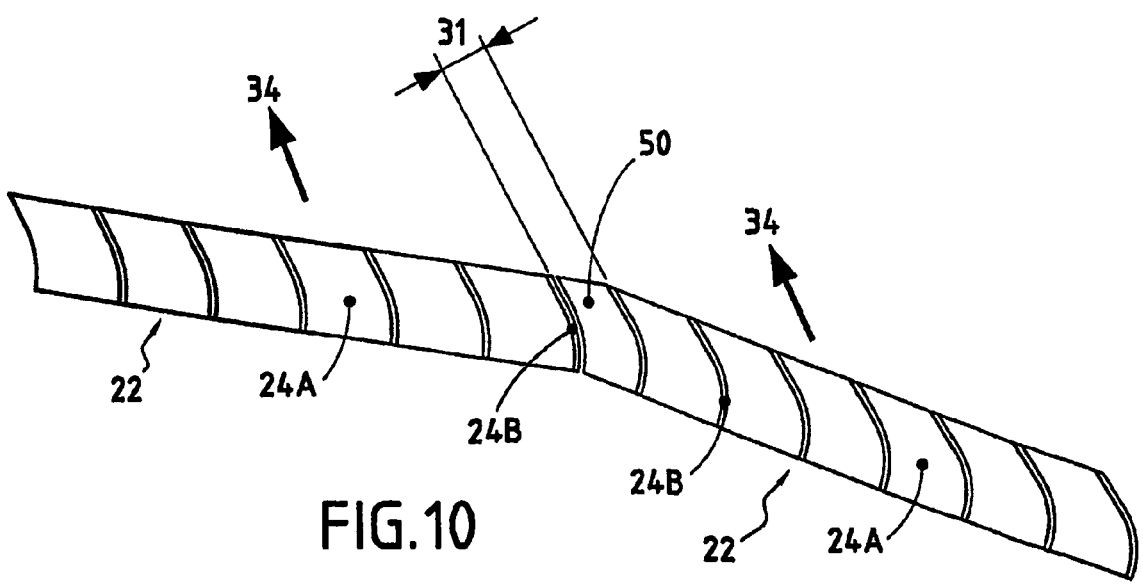
FIG.10

THRUST REVERSER COMPRISING OPTIMIZED DEFLECTOR GRATINGS

FIELD OF THE INVENTION

The present invention relates to thrust-reversal devices for bypass turbojet engines and relates more specifically to an improvement to the flow deflection cascades also known as gratings used inside such devices.

PRIOR ART

Conventionally, a bypass turbojet engine is equipped with a passage behind the fan and whose purpose is to channel the so-called cold secondary flow. This passage is made up of an internal wall surrounding the structure of the actual engine behind the fan, and of an external wall the upstream part of which is a continuation of the engine casing which surrounds this fan. This external wall can channel both the secondary flow and the primary flow in its downstream part, this being behind the ejection of the so-called hot primary flow in the case of mixed-flow nacelles or confluent-flow nacelles for example. By contrast, in the case of so-called separate-flow nacelles, the external wall channels only the secondary flow.

One wall may also streamline the outside of the engine, that is to say the outside of the casing surrounding the fan and the outside of the exterior wall of the aforementioned passage, this being with a view to minimizing the drag of the propulsion unit, particularly in the case of propulsion units attached to the outside of the aircraft, such as those attached on or under the wings or at the rear of the fuselage for example.

FIGS. 1 to 3 illustrate a known exemplary embodiment of a thrust reverser with deflection cascades applied to a bypass turbojet engine.

Such a turbojet engine thrust reverser 10 comprises a moving cowling 12, advantageously made up of two cylindrical half-parts and forming, when the turbojet engine is operating in direct thrust mode, all or part of the downstream end of the external wall of the annular duct 14 through which the stream of secondary flow circulates, and able to be moved axially in the downstream direction by means of an operating system (not depicted) comprising, for example, jacks fixed to the upstream part of the reverser. Moving the cowling in the downstream direction causes the pivoting of a plurality of flaps 16 via link rods 18 connected to a point of articulation on the internal wall 20 of the annular duct 14, these flaps closing off the duct and deflecting the flow in order to form a reversal flow which is guided by means of a cascade device 22 arranged on the external periphery of this duct and of which the cascades, mounted side by side, are uncovered once the cowling has been moved in the downstream direction. These cascades comprise vane sets with greater or less curvature, in one or two directions, depending on the direction desired for the reversal thrust. Specifically, when reversing the thrust, it is necessary to direct the flow passing through certain cascades of the device in a given direction in order to prevent the air from striking undesired parts of the airplane and to avoid direct contact with the ground, in order to minimize or even cancel the possibility that the engine that generates this flow or a nearby engine might ingest this air by ricochet. This special orientation of the sets of vanes also avoids driving any obstacle present on the tarmac onto structures of the airplane, through the same ricochet phenomenon.

In the cascade device illustrated, each cascade is mounted in a parallelepipedal surround in order, on the one hand, to make it easier to install and to fit back on the structure of the nacelle, particularly during maintenance operations where the intervention time is of very great importance and therefore has to be as short as possible and, on the other hand, to give the reversal flow better aerodynamic properties because the width for the passage of the air needs to be approximately the same at the inlet and at the outlet, in the thickness of the cascade. To this end, the aerodynamic configuration of the transverse vanes 24A (longitudinal vanes 24B being straight) of the cascades is designed in such a way as to convert the thrust flow passing through them into a reversal flow advantageously directed toward the front of the nacelle.

Each cascade is fixed to the structure of the nacelle in the conventional way by screws 23 passing, on the one hand, through a front transverse edge 22A and screwed into a structural front part 26 of the reverser and, on the other hand, through a transverse rear edge 22B and fixed into a rear structural part 28 of this reverser. By contrast, the adjacent or middle cascades are not joined together via their parallel longitudinal edges 22C and there is therefore a lateral clearance 30 between each of the cascades of the thrust reverser cascade device.

Bearing in mind the manufacturing installation tolerances, this clearance may prove to be large enough that it generates an air leak 32 in a vertical direction, or even one directed toward the rear of the nacelle, of a particularly great magnitude when the thrust is being reversed, and which then reduces the effectiveness of the two reversal flows 34 leaving the cascades directly on each side of this leak 32, thus producing a thrust towards the rear of the nacelle that is likely to greatly reduce the performance of the aerodynamic braking of the airplane.

This leakage phenomenon is aggravated with a configuration of cascades which have their outlet toward the side, as illustrated in FIG. 4, and in which, depending on the desired direction of flow reversal, the longitudinal vanes 24B of these cascades are curved to a greater or lesser extent in one same direction.

In this configuration, the clearance 31 is greater than the clearance that corresponds to a cascade of parallelepipedal base (the example of FIG. 3) and the negative effect of the leakage flow 32 on the reversal flows directly in contact with it is therefore amplified. To compensate for this negative effect, a conventional approach is to have a far more closed angular arrangement of the transverse vanes 24A and, if need be, of the longitudinal vanes 24B towards the front of the nacelle, necessitating an increase in the length of the cascades in order for them to retain the same cross-sectional area for the passage of the air, something which entails increasing the mass of numerous components, particularly the jacks, thereby affecting the reliability of these parts.

OBJECT AND SUBJECT OF THE INVENTION

The subject of the invention is a deflection cascade device which alleviates these drawbacks. An object of the invention is also to provide a thrust reverser which offers ease of installation and of re-fitting or maintenance of all components of the nacelle, particularly the cascades. In effect, depending on the position of the nacelle on the wings of the airplane, for example in the case of a four-engined airplane, the configuration of the reversal flow may differ from one nacelle to another. This means providing a panoply of cascades with different vane configurations but which can be adapted and interchanged with one another.

These objects are achieved by a cascade device having a reversed flow from the thrust flow of a turbojet engine, comprising a plurality of flow deflection cascades arranged side by side at the external periphery of an annular duct for the circulation of the thrust flow, each cascade consisting of a plurality of transverse internal vanes and longitudinal internal vanes crossing one another, two adjacent cascades being separated by a lateral clearance that generates a leakage flow, characterized in that it comprises means for re-directing said leakage flow in a direction that increases the effectiveness of said reversal flow.

Thus, the leaks are limited and the flow leaving the cascades is re-directed in the desired direction.

Advantageously, the means for re-directing the leakage flow comprise aerodynamic appendages mounted on at least or on the two longitudinal external edges of each cascade, said longitudinal external edge of the cascade preferably consisting of a longitudinal vane.

As a preference, said aerodynamic appendages comprise a plurality of transverse vane tips and each vane tip of said plurality of transverse vane tips of a given cascade has a curvature the same as or different from that of the transverse internal vanes of said cascade. Each vane tip of said plurality of transverse vane tips of a given cascade may be arranged in the continuation of the transverse internal vanes of said cascade and said plurality of transverse vane tips may be arranged in a different number by comparison with the transverse internal vanes of one same cascade.

According to an advantageous embodiment, the number and the curvature of said plurality of transverse vane tips are identical for all the cascades of the device regardless of the number and curvature of the transverse internal vanes. Thus, it is possible to fit aerodynamic appendages to the outside of the longitudinal curved vanes inside the parallelepipedal initial envelope and allow any configuration of cascades with respect to each other to be installed.

BRIEF DESCRIPTION OF THE DRAWINGS

Other features and advantages of the invention will be better understood from reading the description which will follow of some preferred embodiments of the invention, with reference to the attached drawings in which:

FIG. 1 depicts a schematic half-view, in longitudinal section, of a thrust reverser with deflection cascades according to the prior art, depicted in the closed position, FIG. 2 depicts a schematic half-view, in section along the plane of the cascades, of the thrust reverser of FIG. 1.

FIG. 3 depicts a magnification of a detail of FIG. 2, illustrating the middle arrangement of the deflection cascades, FIG. 4 depicts an arrangement similar to that of FIG. 3, applied to a variant of the prior art, FIG. 10 depicts an arrangement similar to that of FIG. 3, applied to a third exemplary embodiment of the invention.

DESCRIPTION OF A PREFERRED EMBODIMENT OF THE INVENTION

Figure 5A:
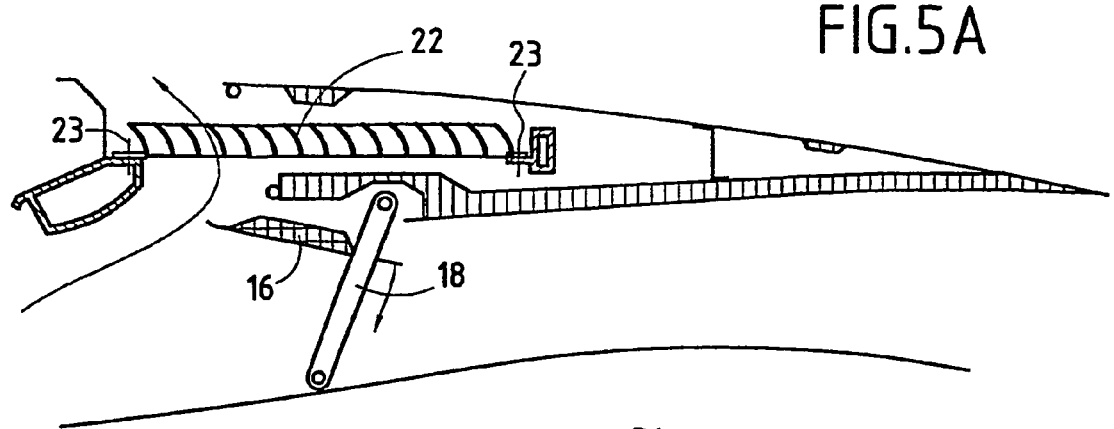
FIG. 5A depicts a schematic half-view, in longitudinal section, of a thrust reverser with deflection cascades according to a first exemplary embodiment of the invention, depicted in the semi-open position.
Figure 5C:
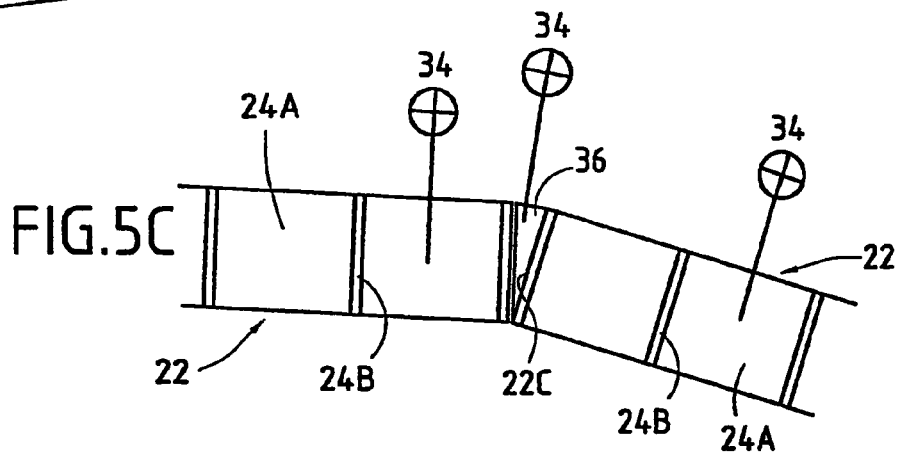
FIG. 5C depicts an arrangement similar to that of FIG. 3, applied to the first exemplary embodiment of the invention of FIGS. 5A and 5B.
Figure 5B:
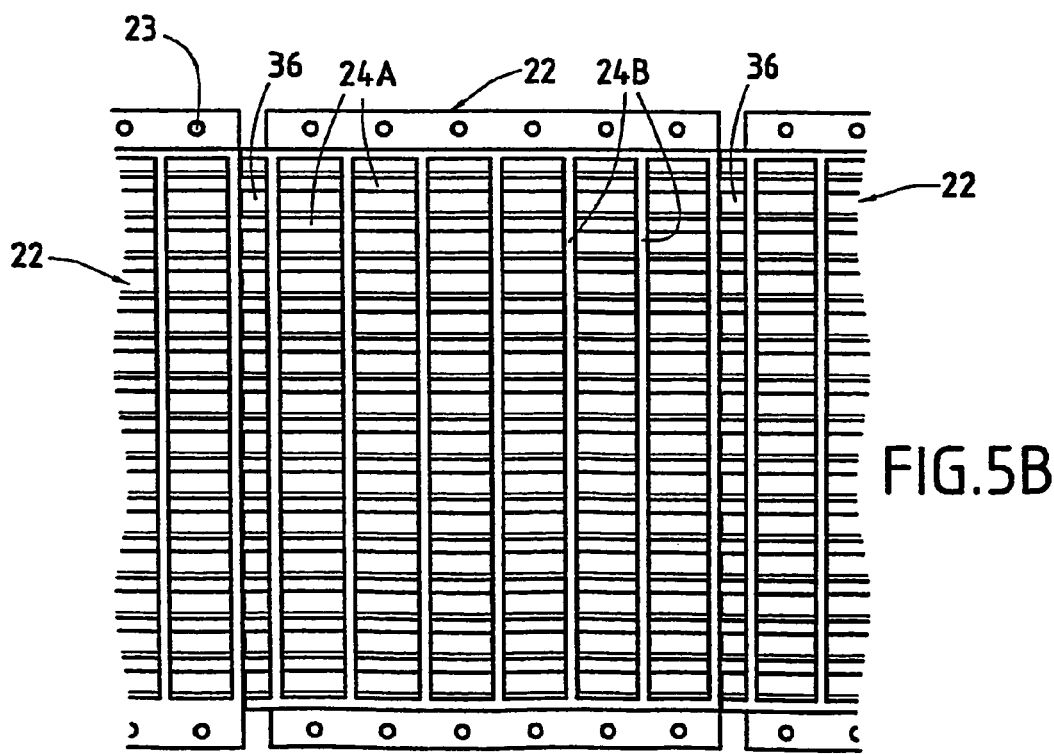
FIG. 5B illustrates a partial view from above of the thrust reverser of FIG. 5A, restricted to its cascades device.

A first exemplary embodiment of the invention applied to a thrust reverser with its outlet forward (that is to say in a direction opposite to the airplane thrust direction) as illustrated in FIG. 5A to 5C. FIG. 5A is a schematic half view, in longitudinal section, of a thrust reverser with deflection cascades the cowling of which is depicted in the semi-open position. FIG. 5B is a partial view from above of the nacelle, cowling open, uncovering the cascades of the thrust reverser and FIG. 5C shows, in detail, the interface between two adjacent or middle cascades 22.

According to the invention, the cascade device comprises means for redirecting forward (in the direction of the reverse flow) the parasitic flow created by the air leak 32 and which was initially at best neutral or at worst generated thrust, so as to improve the effectiveness of the reverse flow. To do this, aerodynamic appendages in the form of transverse vane tips 36 mounted on a longitudinal external edge 22C of each cascade 22 in order to fill the space resulting from the circular layout of the cascade device are added. Each cascade conventionally consists of a plurality of transverse internal vanes 24A and of longitudinal internal vanes 24B which cross one another. Also, these additional appendages are advantageously arranged in the continuation of the transverse vanes 24A and each has a curvature identical to that of the transverse vanes. Thus, the leak is immediately taken in hand by the vane tips which then, like the transverse vanes, direct it towards the front of the nacelle. However, this configuration is not compulsory and the vane tips 36 may be arranged differently, that is to say may be not aligned with the transverse vanes. The number of vane tips may also differ from the total number of transverse vanes. The curvature of these vane tips may differ from that of the transverse vanes. Finally, each vane tip may have a different configuration from its neighbor and likewise for each spacing. Furthermore, this addition of vane tips gives the cascades a trapezoidal cross section by comparison with their initial rectangular cross section, thus increasing the-total surface area for the passage of air through these cascades.

Figure 6:
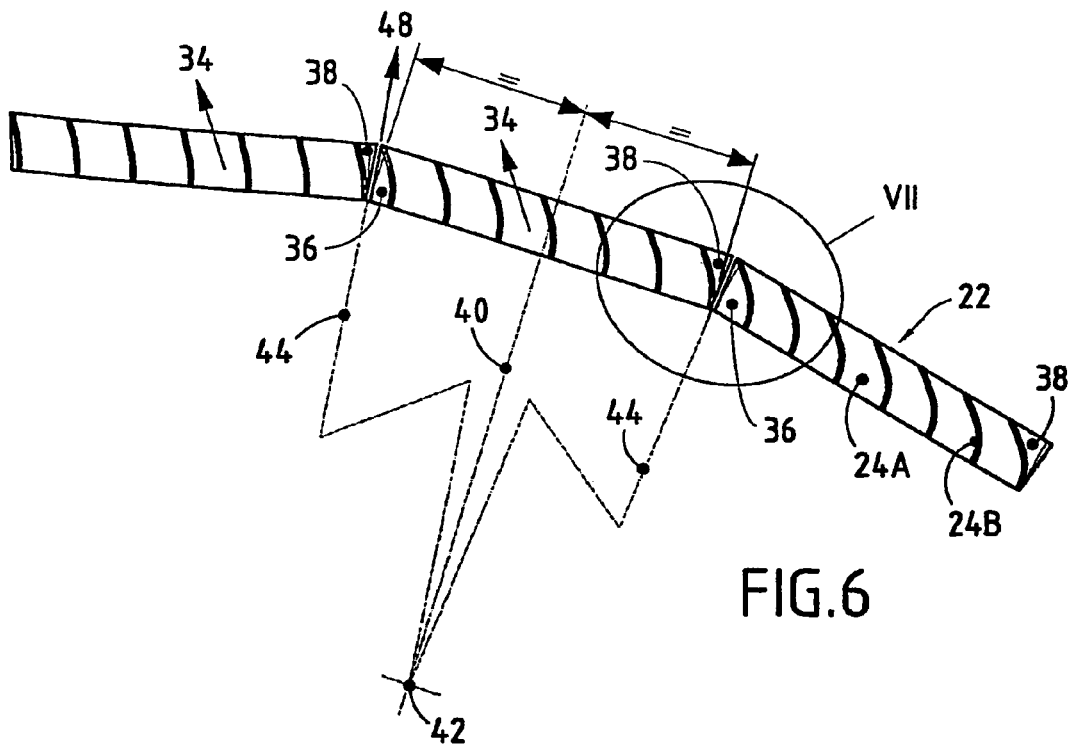
FIG. 6 depicts an arrangement similar to that of FIG. 3 applied to a second exemplary embodiment of the invention.

FIG. 6 is a view depicting a section along the axis of the nacelle through a plane passing through the cascades of a thrust reversal device with its outlet to the side (that is to say in a direction at right angles to the direction of thrust of the airplane).

In this configuration, the cascade device comprises means for redirecting, in the direction of the reversal flow, the parasitic flow created by the air leak 32. These means comprise transverse vane tips 36, 38 fixed to the two longitudinal external edges 22C of each cascade 22 so as to fill the space created by the initial longitudinal clearance 31 resulting from the curvatures of the transverse vanes 24B. The longitudinal cut-out of the vane tips 36, 38 is no longer parallel to an axis 40 passing through the center 42 of the nacelle and the center of the cascade 22 but is now parallel to an axis 44 passing through the center 42 of the nacelle and the middle of the residual longitudinal clearance 46. The cascade 22 is thus in the form of a "trapezium-shape" configuration now rather than a parallelepiped shape, and this, like before, slightly increases the surface area for guiding the flow.

Two further advantages stem from this configuration. The first is a residual leak 48 reduced to a magnitude comparable with a cascade configuration in which the outlet is forward. The second is that this residual leak is immediately taken in hand by the vane tips which, through this effect, give it a direction parallel to the reversal flow, namely toward the front of the nacelle so that it is no longer neutral or a generator of thrust. The reversal flows 34 leaving the vanes directly at the middle of the leak 48 are thereby less disrupted. This results in better effectiveness of the reversal assembly making it possible to reduce the length of the cascades, for the same effectiveness, by comparison with the design in which the leaks were not managed. The mass of many components such as the jacks that operate the moving cowling is thereby reduced and the reliability of the system and of the components concerned is increased.

Figure 7:
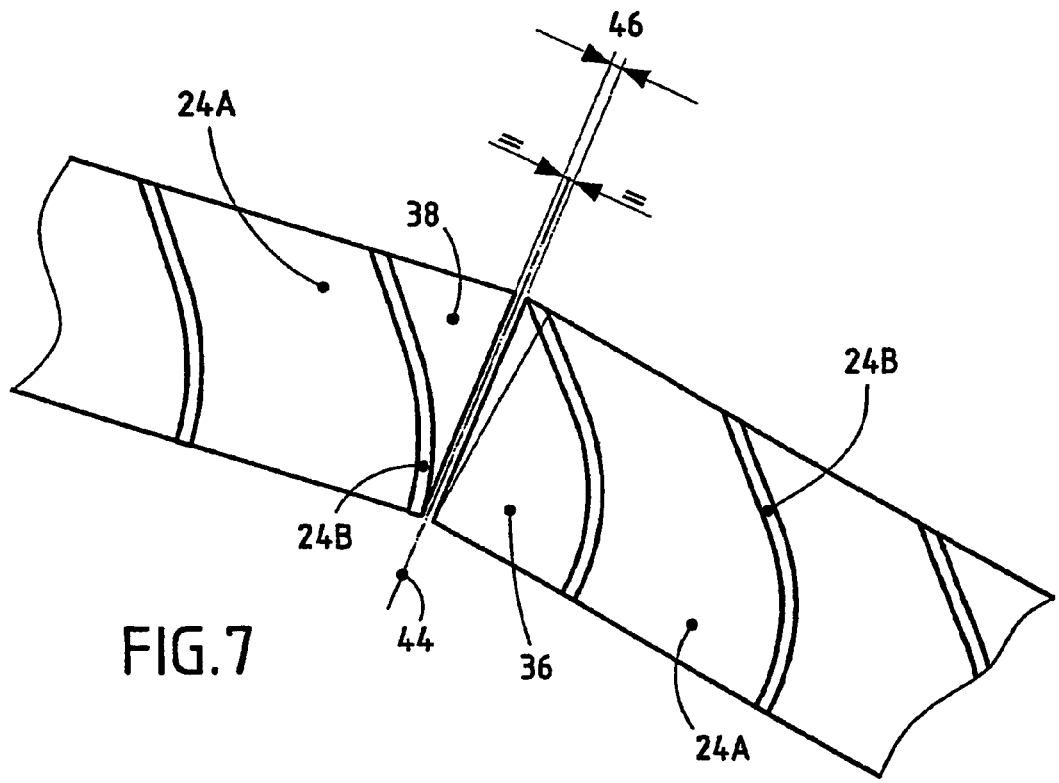
FIG. 7 depicts a magnified detail of an end part of a deflection cascade illustrated in FIG. 6.

Furthermore, the detailed view of FIG. 7 shows the longitudinal vane 24B in contact with the vane tip 38 enjoys the trapezoidal extension of the configuration of the cascade 22 and thus increases the total surface area for the passage of air through this cascade. The initial leakage region is thus filled with appropriate appendages improving the direction of the reversal flow passing through these leakage spaces.

Figure 8:
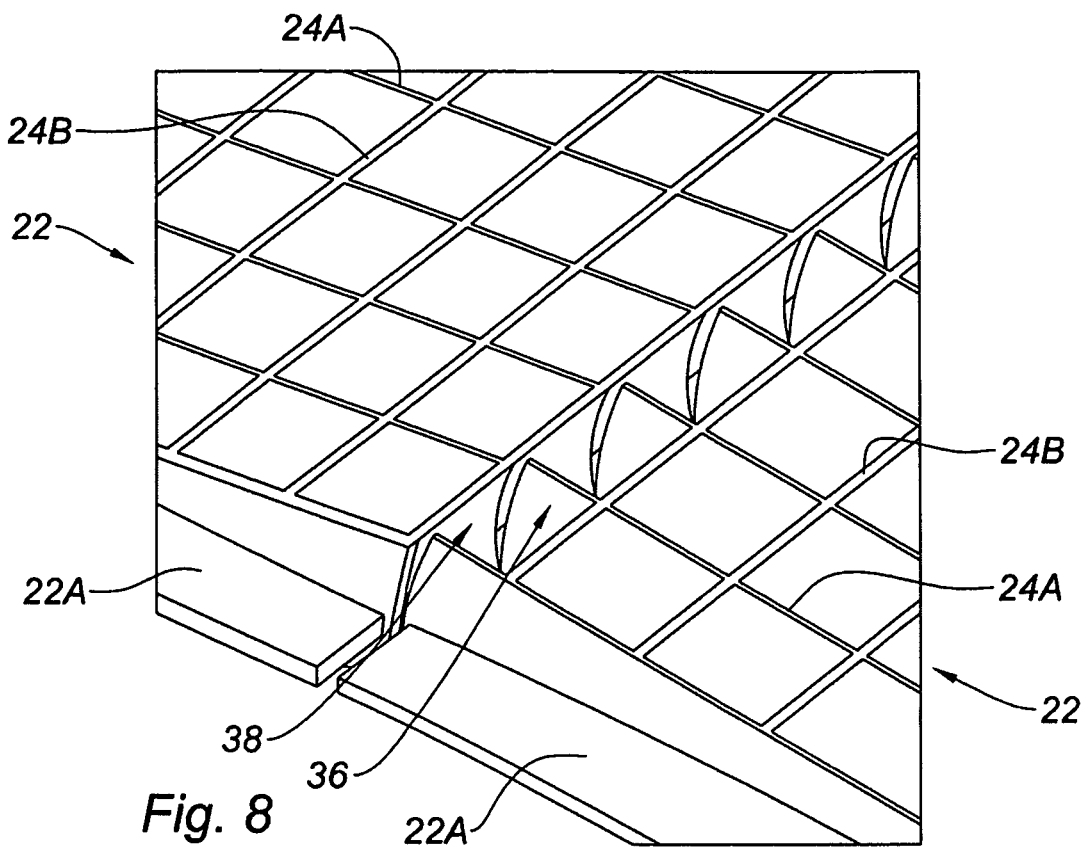
FIG. 8 depicts a lateral arrangement, in perspective, of two middle cascades according to the second exemplary embodiment of the invention.

FIG. 8 is a perspective depiction of the arrangement of two middle cascades as shown in FIG. 6 and 7. In this configuration, the transverse vane tips 36, 38 are depicted in the continuation of the transverse vanes 24A, also known as internal vanes. However, this arrangement of the vane tips is not compulsory because, in particular, each definition of blading may differ from one cascade to another. Thus, as in the previous embodiment, vane tips 36 may be not aligned with the vane tips 38. Likewise, it may be noted that the definition of the vane tips 36, 38 may be specific and different from the transverse vanes 24A of one and the same cascade, in particular in terms of their shape, number and arrangement, these parameters being chosen by the person skilled in the art according to the desired effect.

Figure 9:
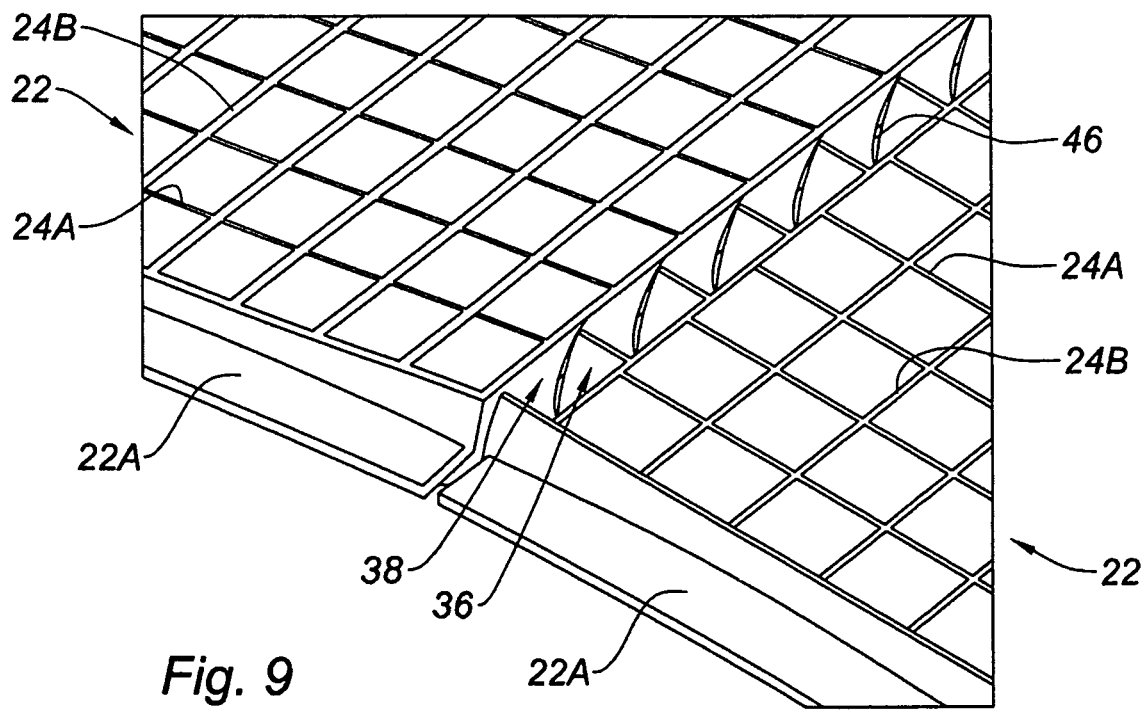
FIG. 9 depicts, in perspective, a lateral arrangement of two middle cascades according to an alternative form of the second exemplary embodiment of the invention.

FIG. 9 depicts a solution to this problem using a unique design for the transverse vane tips 36, 38. Using this remarkable configuration, the vane tips 36 applied to absolutely any configuration of cascade always find themselves in register with the vane tips 38 of absolutely any other configuration of cascade, ensuring optimum aerodynamic performance of the leakage flow.

A second exemplary embodiment of the invention is illustrated in FIG. 10. In effect, it is possible to imagine that, for a cascade configuration that is identical for any reverser, the most suitable solution would be to provide a single set of vane tips 50 which could be mounted on one or other side of the cascade 22 and dimensioned to correspond to the full width between two longitudinal vanes 24B of two middle cascades, give or take the mounting clearance and tolerances. The overall performance is thereby further enhanced with an appreciable improvement in weight saving and reliability.

Furthermore, this arrangement may easily be applied to configurations already in operation without changing the structure of the surrounding components. The gain would then be an appreciable improvement in the reversal performance or even, for the same sought-after reverser reversal effectiveness prior to fitting the panoply, the possibility of using the engine at a lower speed than the speed usually used, thus improving engine life.

The invention claimed is:

1. A cascade device having a reversed flow from the thrust flow of a turbojet engine, comprising a plurality of flow deflection cascades arranged side by side at the external periphery of an annular duct for the circulation of the thrust flow, each cascade consisting of a plurality of transverse internal vanes and longitudinal internal vanes crossing one another, two adjacent cascades being separated by a lateral clearance that generates a leakage flow, characterized in that the cascade device comprises means for re-directing said leakage flow in a direction that increases the effectiveness of said reversal flow.

2. The cascade device as claimed in claim 1, characterized in that said means for re-directing the leakage flow comprise aerodynamic appendages mounted on at least one longitudinal external edge of each cascade.

3. The cascade device as claimed in claim 2, characterized in that the aerodynamic appendages are mounted on the two longitudinal external edges of each cascade.

4. The cascade device as claimed in claim 2, characterized in that said longitudinal external edge of the cascade consists of a longitudinal vane.

5. The cascade device as claimed in claim 2, characterized in that said aerodynamic appendages comprise a plurality of transverse vane tips.

6. The cascade device as claimed in claim 5, characterized in that each vane tip of said plurality of transverse vane tips of a given cascade has a curvature identical to that of the transverse internal vanes of said cascade.

7. The cascade device as claimed in claim 5, characterized in that each vane tip of said plurality of transverse vane tips of a given cascade has a curvature different from that of the transverse internal vanes of said cascade.

8. The cascade device as claimed in claim 5, characterized in that each vane tip of said plurality of transverse vane tips of a given cascade is arranged in the continuation of the transverse internal vanes of said cascade.

9. The cascade device as claimed in claim 5, characterized in that said plurality of transverse vane tips is set out in a different number by comparison with the transverse internal vanes of the same cascade.

10. The cascade device as claimed in claim 5, characterized in that the number and curvature of said plurality of transverse vane tips are identical for all the cascades of the device regardless of the number and curvature of the transverse internal vanes.

11. A thrust reverser for a bypass turbojet engine comprising a cascade device as claimed in claim 1.

* * * * *